United States Patent [19]
Fermann et al.

[11] Patent Number: 5,414,725
[45] Date of Patent: May 9, 1995

[54] HARMONIC PARTITIONING OF A PASSIVELY MODE-LOCKED LASER

[75] Inventors: Martin E. Fermann; Donald J. Harter, both of Ann Arbor, Mich.

[73] Assignees: IMRA America, Inc.; The Regents of the University of Michigan, both of Ann Arbor, Mich.

[21] Appl. No.: 101,049

[22] Filed: Aug. 3, 1993

[51] Int. Cl.⁶ .............................................. H01S 3/098
[52] U.S. Cl. ......................................... 372/18; 372/6; 372/9; 372/20; 372/69; 372/92; 372/25
[58] Field of Search ....................... 372/25, 18, 20, 92, 372/6, 69, 9

[56] References Cited

U.S. PATENT DOCUMENTS

| | | | |
|---|---|---|---|
| 4,435,809 | 3/1984 | Tsang et al. | 372/18 |
| 5,212,711 | 5/1993 | Harvey et al. | 372/25 |
| 5,274,659 | 12/1993 | Harvey et al. | 372/18 |

OTHER PUBLICATIONS

"Additive-pulse-compression mode locking of a neodymium fiber laser", M. E. Fermann et al., Optics Letters, vol. 16, No. 4, Feb. 15, 1991, pp. 244–246.

"All-fiber ring solition laser mode locked with a nonlinear mirror", I. N. Duling, III., Optics Letters, vol. 16, No. 8, Apr. 15, 1991, pp. 539–541.

"1–2 ps Pulses From Passively Mode-Locked Laser diode Pumped Er-Doped Fibre Ring Laser", M. Zirngibl, Electronics Letters, Sep. 12, 1991, vol. 27, No. 19, pp. 1–2.

"Passive mode locking in erbium fiber lasers with negative group delay", M. E. Fermann et al., Appl. Phys. Lett. 62(9), Mar. 1, 1993, pp. 910–912.

"Laser diode-pumped femtosecond erbium-doped fiber laser with a sub-ring cavity for repetition rate control", E. Yoshida et al., Appl. Phys. Lett. 60(8), Feb. 24, 1992, pp. 932–934.

"Solid-state low-loss intracavity saturable absorber for Nd:YLF lasers: an antiresonant semiconductor Fabry-Perot saturable absorber", U. Keller et al., Optics Letters, vol. 17, No. 7, Apr. 1, 1992, pp. 505–507.

*Primary Examiner*—Léon Scott, Jr.
*Attorney, Agent, or Firm*—Burns, Doane, Swecker & Mathis

[57] ABSTRACT

The present invention is directed to providing a passively mode-locked laser which can achieve higher-harmonic mode-locking to produce a pulse repetition rate comparable to that of known actively mode-locked lasers, without requiring the complex modulation schemes typically associated with active techniques. Exemplary embodiments of the present invention are directed to a passively mode-locked laser wherein mode-locking is achieved by harmonic partitioning of the laser cavity. In accordance with the present invention, relatively high repetition rates can be achieved to provide ultra-short pulses without requiring the complex modulation schemes of active techniques, and without becoming susceptible to instabilities typically associated with passive techniques wherein high repetition rates are achieved using subcavities.

21 Claims, 5 Drawing Sheets

HARMONIC PARTITIONING OF A PASSIVELY MODE-LOCKED LASER

BACKGROUND OF THE INVENTION

1. Field of the Invention

The present invention relates generally to an apparatus and method for generating laser energy, and more particularly, to passively mode-locked lasers capable of providing ultra-short pulses.

2. State of the Art

Both actively mode-locked lasers and passively mode-locked lasers are well known in the laser art. However, to provide ultra-short pulses for use in environments such as communications applications where ultra-high bit rates are desirable, actively mode-locked lasers are used since typical passively mode-locked lasers have limited operation at low repetition rates.

Passively mode-locked lasers, and in particular, passively mode-locked fiber lasers, have been limited to operation at low repetition rates because of the low gain cross-section associated with rare-earth doped fibers and their tendency to energy loss via cross relaxations at high rare-earth doping levels. This constraint results in typical active fiber lengths being greater than 1 meter for the case of erbium ions. Although useful neodymium fibers can have lengths less than 1 meter, such fiber lengths are uncommon due to impracticalities in manufacture and handling.

A fundamental cavity frequency for a passively mode-locked fiber laser is typically limited to approximately 100 MegaHertz. Although high repetition rates are obtained by inserting subcavities into the cavity of the passively mode-locked fiber laser, this results in the laser becoming sensitive to phase fluctuations between the various cavities and results in unstable operation.

Thus, attention focused on the development of actively mode-locked fiber lasers for achieving higher-harmonic mode-locking using an active modulating scheme. Such active modulating schemes are insensitive to phase fluctuations, and can thereby provide a relatively stable pulse train at repetition rates of, for example, up to several GigaHertz.

Although actively mode-locked lasers have generally been accepted as suitable for use in achieving higher-harmonic mode locking, it would be desirable to provide a passively mode-locked laser which can achieve higher-harmonic mode locking without requiring the active modulation associated with actively-mode-locked lasers. Passive mode-locking techniques avoid the need for modulation electronics, and thus can provide a cost effective, efficient laser.

SUMMARY OF THE INVENTION

The present invention is directed to providing a passively mode-locked laser which can achieve higher-harmonic mode-locking to produce a pulse repetition rate comparable to that of known actively mode-locked lasers, without requiring the complex modulation schemes typically associated with active techniques. Exemplary embodiments of the present invention are directed to a passively mode-locked laser wherein mode-locking is achieved by harmonic partitioning of the laser cavity. In accordance with the present invention, relatively high repetition rates can be achieved to provide ultra-short pulses without requiring the complex modulation schemes of active techniques, and without becoming susceptible to instabilities typically associated with passive techniques wherein high repetition rates are achieved using sub-cavities.

Generally speaking, exemplary embodiments of the present invention described herein relate to a passively mode-locked laser comprising means for generating laser energy and means for pumping the laser energy generating means, the laser energy generating means having a harmonically partitioned cavity. In accordance with exemplary embodiments, the harmonically partitioned cavity further includes a gain medium for amplifying energy in the cavity, means for reflecting energy along an axis which passes through the gain medium, a saturable absorber located along the axis to partition the axis within the cavity into first and second lengths, the first length being greater than the second length, and means for outputting laser light generated within the cavity.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
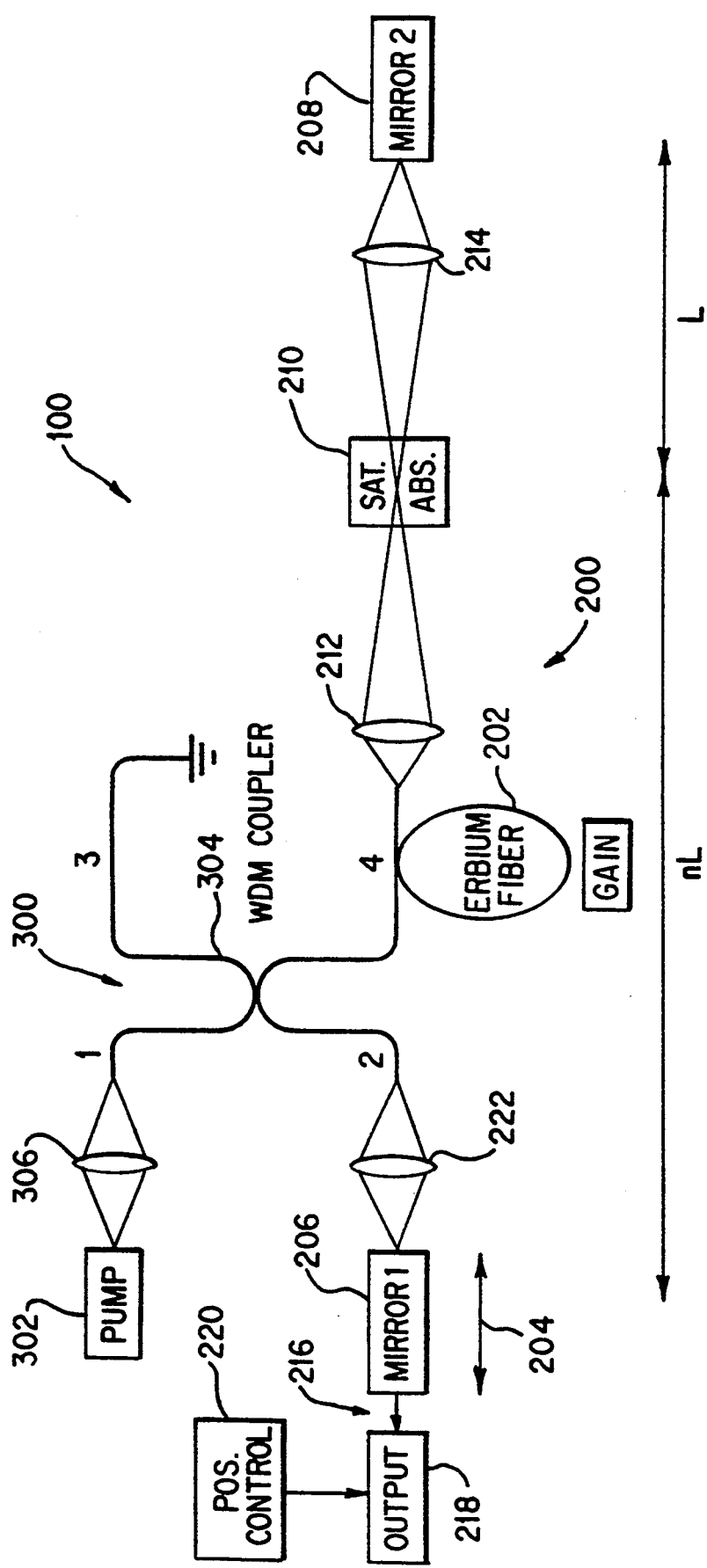
FIG. 1 shows an exemplary embodiment of a passively mode-locked laser in accordance with the present invention.

FIG. 1 illustrates a passively mode-locked laser in accordance with an exemplary embodiment of the present invention. The passively mode-locked laser is generally designated 100, and includes a means for generating laser energy generally designated as a laser cavity 200. In accordance with a significant feature of the present invention, the laser energy generating means is a harmonically partitioned cavity, such as a Fabry-Perot cavity. The passively mode-locked laser 100 further includes a means for pumping the laser energy generating means, the pumping means being generally designated 300.

As illustrated in the exemplary FIG. 1 embodiment, the harmonically partitioned cavity includes a gain medium 202 for amplifying energy in the cavity 200. The gain medium can be any rare-earth doped fiber capable of providing light amplification (i.e., gain). For purposes of the following discussion, reference will be made to an optically pumped laser having an active fiber doped with erbium ions as the gain medium 202. However, those skilled in the art will appreciate that other rare-earthed doped fibers, such as fibers doped with neodymium ions, can be used. Further, the present invention is not limited to fiber lasers, but can also be used with other types of lasers such as bulk solid state lasers comprising a gain medium of bulk solid state materials, and semiconductor lasers. Optical or electrical pumping can be used, although optical pumping is generally preferred for use with bulk solid state lasers while electrical pumping is generally preferred for semiconductor lasers.

The harmonically partitioned cavity 200 also includes means for reflecting energy along an axis which passes through the gain medium, the axis being generally designated by the arrow 204. The energy reflecting means as illustrated in FIG. 1 includes a first cavity mirror 206 located at a first end of the cavity 200. The cavity mirror 206 is a partial reflector for signal light which allows leakage of laser energy out of the cavity 200. Further, the energy reflecting means includes a second cavity mirror 208 located at a second end of the cavity 200, with the second end of the cavity being opposite the first end. The second cavity mirror 208 is a total reflector for a signal light. Each of the first and second cavity mirrors can be any standard laser mirror readily available and known to those skilled in the art.

In accordance with a significant feature of the present invention, the harmonically partitioned cavity includes a saturable absorber 210 located along the axis 204 to partition the axis within the cavity into first and second lengths. The saturable absorber 210 can be any semiconductor saturable absorber having its band edge located in a vicinity of the laser wavelengths produced by the cavity. However, for purposes of the following discussion, reference will be made to a multiple quantum well (MQW) saturable absorber which can, for example, be based on AlInAs barriers and GaInAs wells.

The saturable absorber 210 is located between the first cavity mirror 206 and the second cavity mirror 208 such that a distance between the first cavity mirror and the saturable absorber 210 constitutes a first length and the distance between the saturable absorber and the second mirror constitutes a second length. In accordance with a significant feature of the present invention, the saturable absorber 210 is located asymmetrically within the cavity between the first and second cavity mirrors 206 and 208 such that the first length is unequal to the second length. In this regard, the positioning of the saturable absorber to divide the cavity between the first and second cavity mirrors into two unequal lengths (i.e., asymmetric positioning of the saturable absorber) will provide harmonic partitioning.

Those skilled in the art will appreciate that the wave length of the laser beam will not be constant in the laser 100 due to the existence of different media through which the laser beam passes. That is, although optical frequency of light transmitted within the cavity remains constant, wavelength changes due to different mediums (e.g., air or fiber) occur. Accordingly, the "first length" in FIG. 1 is designated as an "n" multiple of the round trip distance L between the saturable absorber 210 and the second mirror 208, wherein L is the roundtrip optical path length. By defining L as a function of optical path length, the differences in wavelength due to different media are taken into account.

The laser energy generating means 200 further includes a laser energy outputting means 216. In an exemplary embodiment, the laser energy outputting means 216 can be represented by the first cavity mirror 206. In such an embodiment, the first cavity mirror 206 serves two functions; it reflects a fraction of energy impinging onto it back into the laser cavity 200, with the remaining fraction leaking through the first cavity mirror 206 and being used as output energy. The first cavity mirror 206 can include an output coupler designated 218 in FIG. 1.

Where the first cavity mirror 206 is used to provide output energy, the first cavity mirror can be mounted on a position control generally designated as positioning means 220 in FIG. 1. The positioning means translates the output coupler 218 of the first cavity mirror 206 to adjust the total round-trip length of the laser cavity. This position control can be used to optimize the harmonic partitioning on a trial-and-error basis. Where an optimal position of the first mirror is located, the position control can, if desired, be eliminated and the first mirror fixed in place. Those skilled in the art will appreciate that rather than adjusting only the first mirror position, the second mirror position, the saturable absorber position or any combination therefore can be adjusted.

The laser energy outputting means also includes a third lens 222 for focusing energy from the gain medium 202 onto the first cavity mirror 206. The third lens thus minimizes unwanted energy losses of light traveling between the gain medium 202 and the output coupler 218.

In an exemplary embodiment, the distance from the first cavity mirror 206 to the saturable absorber 210 is chosen to be an n-multiple of the distance from the saturable absorber 210 to the second cavity mirror 208. Thus, the saturable absorber 210 will favor short pulse over cw oscillation, and its saturation characteristics will favor a localization of counter-propagating pulses at the saturable absorber 210. In other words, a colliding pulse mode-locked operation will occur in the saturable absorber due to the collision of pulses traveling from the gain medium 202 toward the second cavity mirror 208 and the counter propagating pulses traveling from the second cavity mirror 208 toward the gain medium 202.

Due to the position of the saturable absorber with respect to the first and second cavity mirrors 206, 208, the saturable absorber 210 is optimally saturated when exactly (n+1) pulses oscillate in the cavity 200 simultaneously such that stable high-harmonic mode-locking is obtained. For example, a stable pulse train can be generated in the gain medium 202 at a repetition rate of, for example, 260 MegaHertz, corresponding to a passive mode-locking at the seventeenth harmonic of the fundamental cavity frequency. In this regard, the saturable absorber 210 can be positioned to ensure pulse collisions within the boundaries of the saturable absorber, thus requiring a positioning accuracy of the saturable absorber on the order of 1 pulse width. This constraint can be easily satisfied without feedback control.

It is important to note that the energy-densities impacting the saturable absorber 210 must be controlled to a high accuracy in order to match the saturation characteristics of the saturable absorber (e.g., by trial-and-error) and to avoid pulse-bunching or unstable repetition rates. Further, the saturable absorber saturation energy should be matched to the soliton energy of the fiber laser, and the total cavity length should be matched to the soliton period to ensure high-quality pulse generation without pedestals (e.g,. by trial-and-error).

Figure 4:
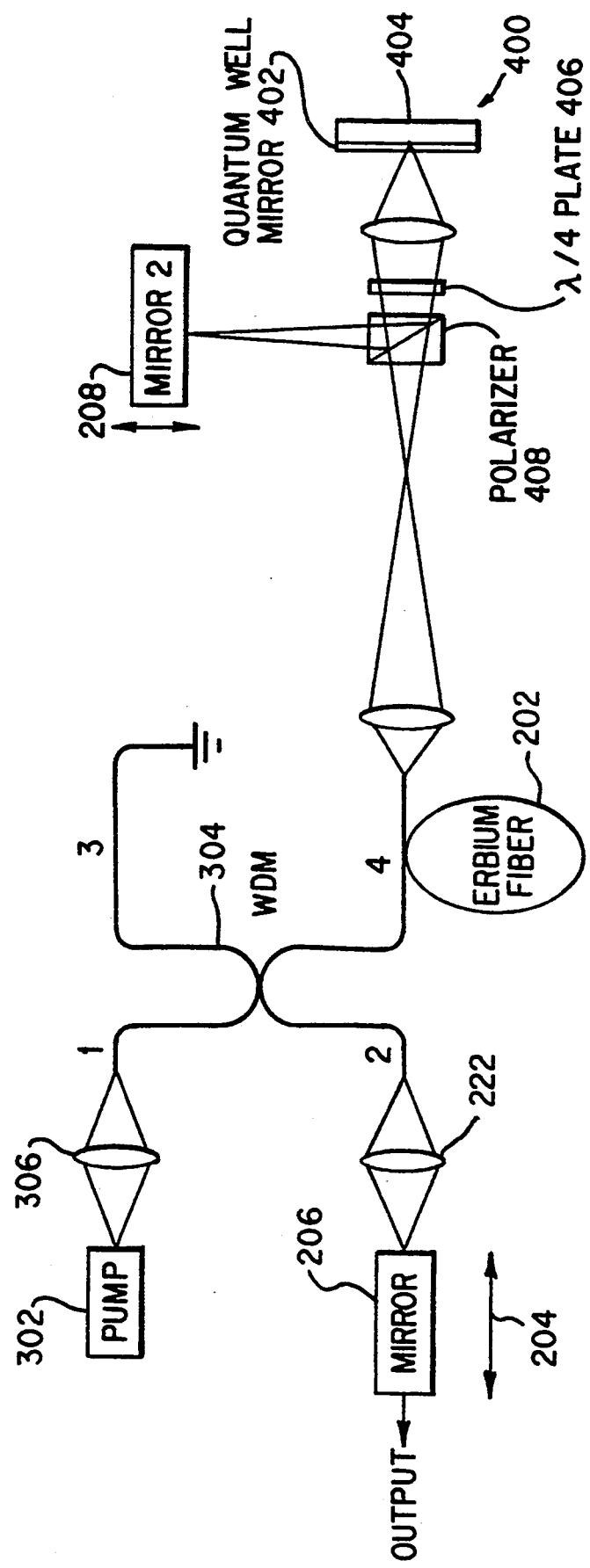
FIG. 4 shows an alternate exemplary embodiment of the invention.

Although the saturable absorber has been illustrated in the FIG. 1 exemplary embodiment as being located asymmetrically between the first and second cavity mirrors, those skilled in the art will readily appreciate that other embodiments of the present invention can be implemented to achieve the harmonic partitioning described. For example, as illustrated in FIG. 4, a saturable absorber 400 can be formed as a multiple quantum well 402 grown on a stacked mirror structure 404. Using a combination of a quarter-wave plate 406 and a polarizer 408, light reflected by the saturable absorber mirror 404 can be rotated and directed onto the second cavity mirror 208 located 90° relative to the axis 204. A quadruple pass through the quarter-wave plate will rotate the polarization back to its original state and direct pulses back toward the gain medium 202 such that the saturable absorber will be saturated by quadruple pulse collisions.

In the FIG. 4 embodiment, the second cavity mirror 208 can be translated in a direction perpendicular to translation of the first cavity mirror 206. Although position control for translating mirrors 206 and 208 is not shown in FIG. 4, those skilled in the art will appreciate that a position control 220 of FIG. 1 can be used for this purpose.

In an exemplary embodiment, the gain medium 202 can be an active fiber (e.g., erbium) having a total single-pass fiber length of five meters in the cavity 200, three meters of which are doped with approximately $5 \times 10^{18}$ erbium ions/centimeters$^3$. A core radius of the erbium fiber can be 2.5 micrometers with a cut-off wavelength of 1.1 micrometers. However, those skilled in the art will appreciate that with the FIG. 1 configuration, fiber lengths on the order of 1 meter can be used in the cavity. It is only necessary to choose an active fiber length suitable for obtaining a desired stable pulse train with a desired repetition rate.

Referring to FIG. 1, it can be seen that the passively mode-locked laser 100 further includes means for focusing energy generated along the axis 204 onto the saturable absorber 210. The FIG. 1 energy focusing means includes a first lens 212 for focusing energy received from the gain medium 202 onto the saturable absorber 210. In addition, the energy focusing means includes a second lens 214 for focusing energy reflected from the second cavity mirror onto the saturable absorber 210. It is important that the focal points of the lenses 212 and 214 be selected to coincide with the positioning of the saturable absorber 210 so that the power density on the saturable absorber is maximized and the saturable absorber is optimally saturated.

As mentioned previously, the passively mode-locked laser illustrated in the exemplary FIG. 1 embodiment includes a laser energy pumping means 300. The pumping means includes an energy source (e.g., electrical or optical energy source, depending on laser type) generally represented as a pump 302. In the exemplary FIG. 1 embodiment, where an erbium fiber is used as the gain medium, the pump 302 is an optical pump.

A wavelength-division multiplexing coupler 304 is provided for coupling the pumping means to the cavity 200. A focusing means represented by a fourth lens 306 can be used as an interface between the pump 302 and the wavelength division multiplexing coupler (WDM) 304. The wavelength division multiplexing coupler can be any multiplexer which allows pumping of the laser cavity 200 without loss of signal light; i.e., one which allows differential coupling between the pump 302 and the signal light. In an exemplary embodiment, the pump 302 can produce energy in the 980 nanometer wavelength range, and the wavelength division multiplexer coupler can be an Aster WDM 1550/980 to accommodate a 980 nanometer pump and a 1550 nanometer signal.

While the FIG. 1 embodiment illustrates significant features of the present invention, those skilled in the art will readily appreciate that alternate embodiments of the invention can readily be implemented. For example, each of the lenses illustrated in the FIG. 1 embodiment can focus the laser energy to a point with a beam diameter of less than approximately 10 micrometers. That is, the first lens 212 and the second lens 214 can focus the colliding beam paths to beam widths (i.e., diameters) of less than 10 micrometers in the saturable absorber. However, the desired accuracy for a given application can be selected by the designer. Further, while lenses 222 and 306 are illustrated for interconnecting various FIG. 1 elements with the wave division multiplexing coupler and the gain medium, those skilled in the art will appreciate that direct coupling to the fiber can be implemented such that these lenses can be removed.

Alternately, additional lenses can be used if desired. For example, rather than using two lenses to focus laser energy onto the saturable absorber, additional lenses (e.g., four lens) can be used. Further, while only a single saturable absorber is illustrated in the FIG. 1 embodiment, more than one saturable absorber can be used. Those skilled in the art will appreciate that a significant feature of the present invention relates to asymmetric positioning of one or more saturable absorbers so that pulse collisions occur in the saturable absorber(s) at the same time. For example, two saturable absorbers could be symmetrically positioned on the left and right hand side of the FIG. 1 cavity 200. Alternately, three saturable absorbers could be positioned in the cavity 200 with two of the saturable absorbers being symmetrically positioned to the left and right hand sides of the FIG. 1 cavity 200, and the third saturable absorber being positioned in the center of the cavity.

Figure 5:
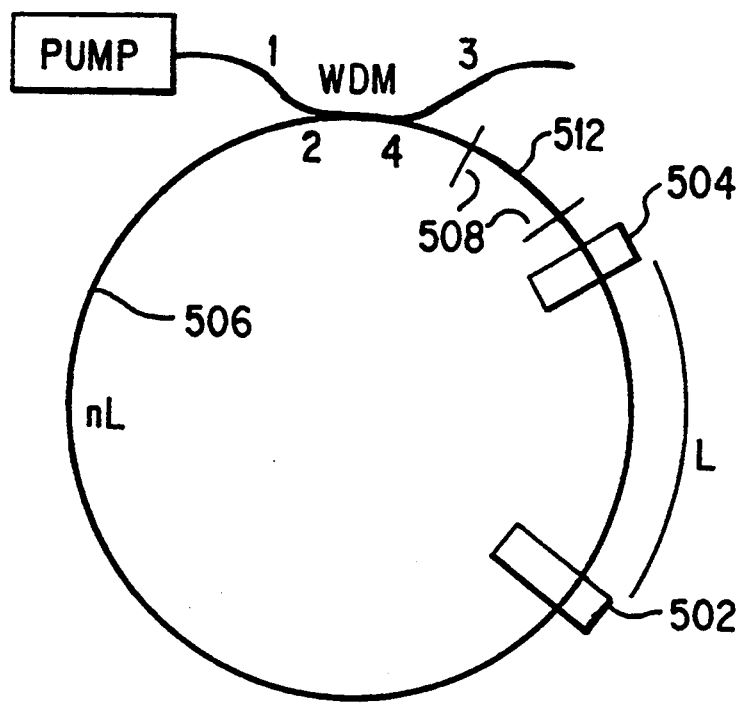
FIG. 5 shows yet another alternate embodiment of the invention.

Further, the FIG. 1 embodiment has been illustrated with a linear cavity. However, alternate embodiments will be readily apparent to those skilled in the art. For example, a ring cavity as illustrated in FIG. 5 can be used with two saturable absorbers 502 and 504 harmonically partitioning the ring. In this case, the saturable absorbers can be positioned by a separation distance L, with L corresponding to $1/(n+1)$th of the circumference of the ring, which has an optical path length of $(n+1)L$. The ring cavity further includes an undoped fiber 506, splices 508 (for interconnecting the undoped fiber with a gain medium) and a gain medium such as an erbium fiber 512.

In an exemplary embodiment, the power of the pump 302 can be up to 400 milliWatts or greater (e.g., typically less than 1 Watt). For example, the pump can be a 980 nanometer titanium sapphire source which produces a signal wavelength of 1.55 micrometers. Input/output leads of the wavelength division multiplexing coupler are labelled 1–4, with the lead 1 being connected to the pump 302, the lead 2 being connected to the cavity mirror 206 where this mirror represents a 50% output coupler, the output lead 3 being terminated with all fiber ends angle-cleaved to minimize spurious reflections, and the lead 4 being connected to the gain medium 202. The wavelength division multiplexing coupler can, for example, be the Aster WDM having two input ports and two output ports, with light being directed from the first input port (i.e., from the pump) to the saturable absorber via the gain medium. Light which passes from the gain medium (e.g., erbium fiber) to the second cavity mirror 208 is reflected back through the wavelength division multiplexing coupler to the second input port 2 of the wavelength division multiplexing coupler 304.

The laser 100 of FIG. 1 can be operated in a continuous mode or can be operated in a pulsed oscillation mode (POM). However, due to the use of a saturable absorber in the exemplary embodiments described herein, wherein loss of energy decreases in the saturable absorber with increased intensity of the signal, short pulsed oscillation modes of operation are preferred. In a short pulse oscillation mode, a decrease in loss occurs in the saturable absorber.

Figure 2:
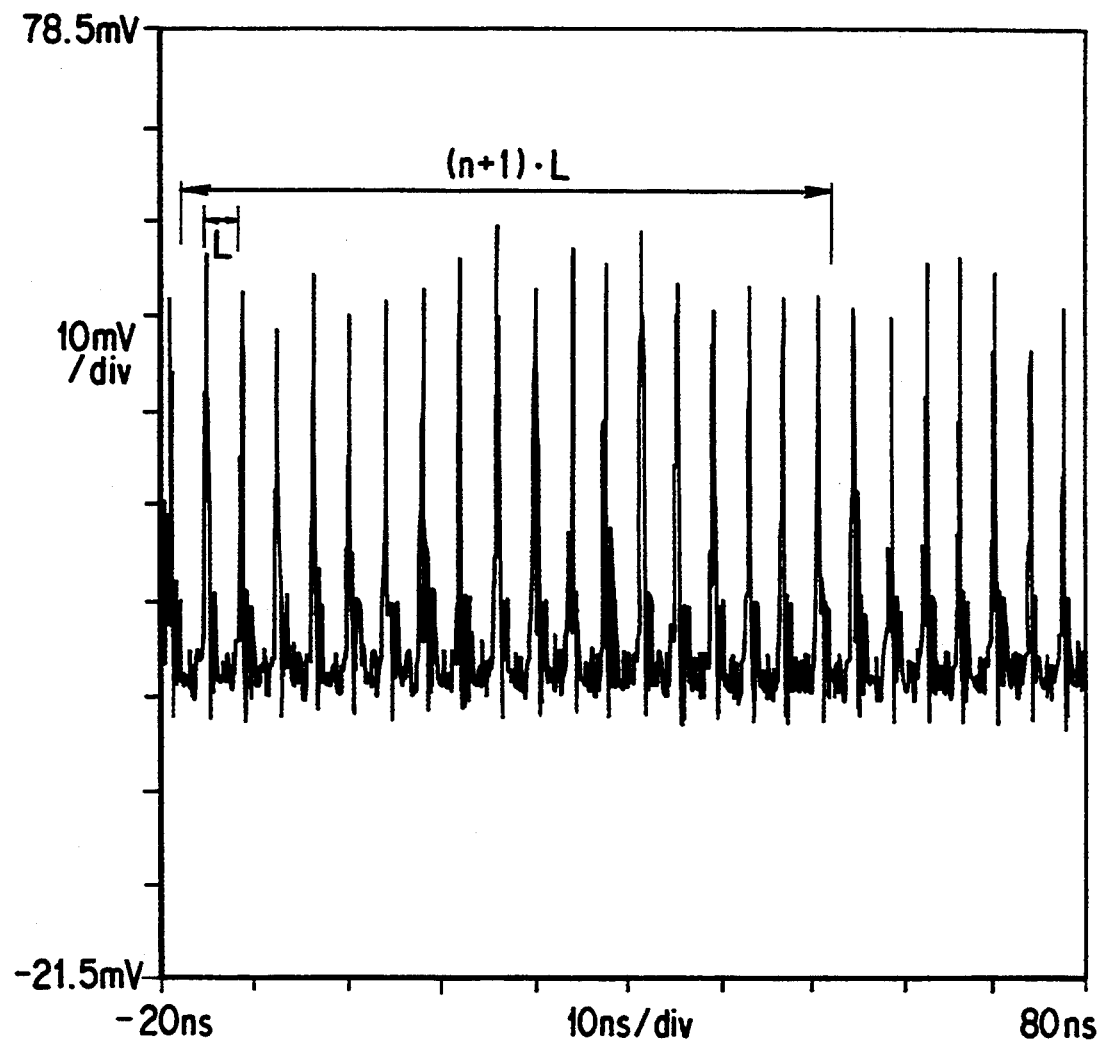
FIG. 2 shows a plot of a typical pulse train obtained in accordance with an exemplary embodiment of the present invention.
Figure 3:
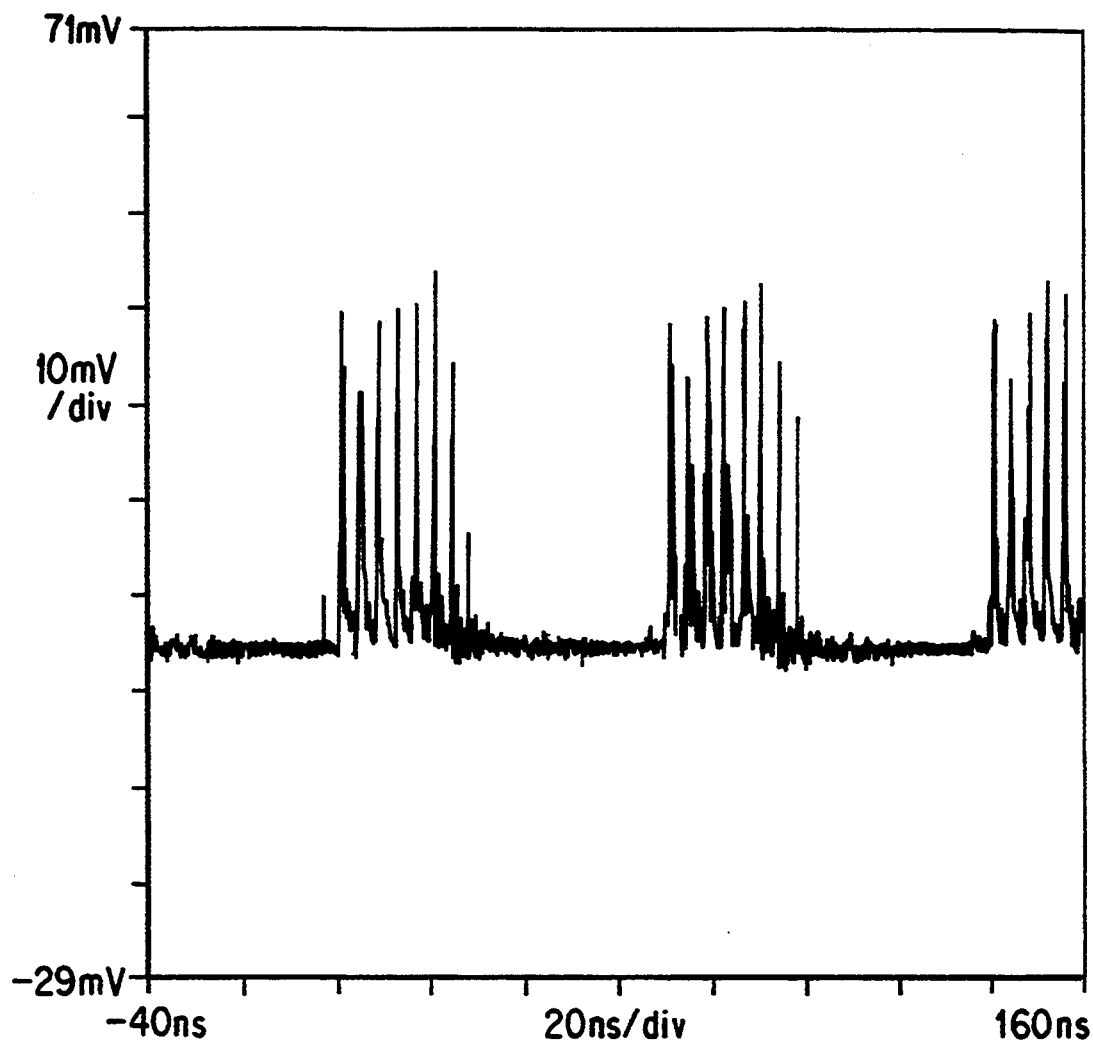
FIG. 3 shows unstable repetition rates or pulse bunches for a passively mode-locked fiber laser where harmonic mode-locking was lost.

Operation of the FIG. 1 embodiment will now be described with reference to the exemplary pulse trains illustrated in FIGS. 2 and 3. In operation, mode locking is self-starting in the exemplary embodiment illustrated, and a mode-locked power of 10 milliWatts can be obtained. Power output will, however, vary depending on the type of laser. For example, a typical fiber laser can produce an output power ranging from 1 to 50 milliWatts or greater (e.g., for less than 1 Watt power input).

Stable higher-harmonic mode-locking can be obtained by controlling focusing of the laser energy onto the saturable absorber and by controlling the total cavity length by adjustment of the first cavity mirror 206. By selecting a gain medium as a fiber with an appropriate active fiber length, a pulse train repetition rate can be achieved up to, for example, 216 MegaHertz, corresponding to a higher-harmonic mode-locking with n=17 pulses simultaneously being present in the cavity. The 17 pulses obtained in the cavity are illustrated, for example, in FIG. 2, wherein the cavity length is represented by the arrow designated (n+1)×L. The separation distance between each pulse in FIG. 2 is represented by the distance L.

Even under optimum conditions, the pulse train can be modulated by about 10% at the fundamental cavity frequency without electronic modulation. This modulation can be attributed to unwanted leakage and/or a asymmetries in the cavity. However, such leakage and asymmetries can be minimized through optimized cavity design. The short cavity length can be changed by approximately plus or minus 300 micrometers without loss of harmonic mode-locking, thus demonstrating the insensitivity of the mode-locking process to the position of the saturable absorber 210 in FIG. 1.

Harmonic mode-locking loss can occur when changing the cavity length beyond the allowable limit or when changing the focusing onto the saturable absorber. In this case, unstable repetition rates or pulse bunches can occur, as illustrated in FIG. 3.

The foregoing has described exemplary embodiments of the present invention directed to the harmonic partitioning of a passively mode-locked laser. Without using any phase-sensitive subcavities, stable passive mode-locking can be obtained at the seventeenth harmonic of the fundamental cavity frequency, up to pulse repetition rates of, for example, 260 MegaHertz. Thus, stable generation of pulse trains at GigaHertz repetition rate can be obtained without any modulation electronics.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A passively mode-locked laser comprising:
   means for generating laser energy; and
   means for pumping said laser energy generating means, said laser energy generating means having a harmonically partitioned cavity which includes:
   a gain medium for amplifying energy in the cavity;
   means for reflecting energy along an axis which passes through the gain medium;
   a saturable absorber asymmetrically located along said axis to harmonically partition said axis within said cavity into first and second lengths for passive mode-locking of the laser, said first length being greater than said second length; and
   means for outputting laser energy generated within said cavity.

2. A passively mode-locked laser according to claim 1, wherein said energy reflecting means further includes:
   a first cavity mirror located at a first end of said cavity;
   a second cavity mirror located at a second end of said cavity opposite said first end, said saturable absorber being located between said first and second cavity mirrors such that a distance between said first cavity mirror and said saturable absorber constitutes said first length and said distance between said saturable absorber and said second mirror constitutes said second length.

3. A passively mode-locked laser according to claim 2, wherein said cavity further includes:
   means for focusing energy generated along said axis onto said saturable absorber.

4. A passively mode-locked laser according to claim 3, wherein said energy focusing means further includes:
   a first lens for focusing energy received from said gain medium onto said saturable absorber; and
   a second lens for focusing energy reflected from said second mirror onto said saturable absorber.

5. A passively mode-locked laser according to claim 1, wherein said second length is a multiple of said first length.

6. A passively mode-locked laser according to claim 1, wherein said saturable absorber is positioned along said axis within said cavity such that pulse collisions occur within boundaries of the saturable absorber to produce colliding pulse mode-locked operation.

7. A passively mode-locked laser according to claim 1 for providing soliton energy, wherein a saturation energy of the saturable absorber is controlled relative to the soliton energy of the passively mode-locked laser, and wherein a total length of said cavity is selected relative to a soliton period.

8. A passively mode-locked laser according to claim 1, wherein said saturable absorber is a multiple quantum well saturable absorber.

9. A passively mode-locked laser according to claim 1, wherein said laser energy outputting means further includes:
   an output coupler for emitting laser energy from said cavity;
   means for focusing energy from said gain medium onto said output coupler; and
   means for positioning said output coupler to adjust a total length of said cavity.

10. A passively mode-locked laser according to claim 1, wherein said pumping means further includes:
an energy source; and
a wavelength-division multiplexing coupler for coupling said pumping means to said cavity.

11. A passively mode-locked laser according to claim 1, wherein said gain medium is an erbium fiber.

12. A passively mode-locked laser according to claim 1, wherein said cavity has a fundamental cavity frequency, with passive mode-locking being provided at an arbitrary harmonic of the fundamental cavity frequency.

13. A passively mode-locked laser according to claim 1, wherein said medium is a fiber having an arbitrary total length.

14. A passively mode-locked laser according to claim 1, wherein said harmonically partitioned cavity is a linear cavity.

15. A passively mode-locked laser according to claim 1, wherein said harmonically partitioned cavity is a ring cavity having at least two saturable absorbers.

16. A passively mode-locked laser according to claim 1, Wherein said saturable absorber is formed as a multiple quantum well grown on a stacked mirror structure.

17. A passively mode-locked laser comprising:
means for generating laser energy; and
means for pumping said laser energy generating means, said laser energy generating means having a cavity harmonically partitioned by a saturable absorber which is asymmetrically positioned to divide the cavity into first and second lengths for passive mode-locking of the laser, said first length being greater than said second length.

18. A passively mode-locked laser according to claim 17, wherein said laser energy generating means is a fiber laser.

19. A passively mode-locked laser according to claim 18, wherein said cavity further includes a gain medium for amplifying energy in said cavity, said gain medium being an erbium fiber.

20. A passively mode-locked laser according to claim 17, wherein said pumping means is an optical pump.

21. A passively mode-locked laser according to claim 17, wherein said pumping means is an electrical pump.

* * * * *